(12) United States Patent
Deliwala et al.

(10) Patent No.: US 11,620,641 B1
(45) Date of Patent: *Apr. 4, 2023

(54) SYSTEMS AND METHODS FOR IN-APPLICATION AND IN-BROWSER PURCHASES

(71) Applicant: American Express Travel Related Services Company, Inc., New York, NY (US)

(72) Inventors: Manish K. Deliwala, Chandler, AZ (US); Ajay B. Maddukuri, Phoenix, AZ (US); John G. McDonald, Eugene, OR (US); Keshav A. Narsipur, Chandler, AZ (US)

(73) Assignee: American Express Travel Related Services Company, Inc., New York, NY (US)

( * ) Notice: Subject to any disclaimer, the term of this patent is extended or adjusted under 35 U.S.C. 154(b) by 91 days.

This patent is subject to a terminal disclaimer.

(21) Appl. No.: 17/205,417

(22) Filed: Mar. 18, 2021

Related U.S. Application Data

(63) Continuation of application No. 14/936,294, filed on Nov. 9, 2015, now Pat. No. 10,997,590.
(Continued)

(51) Int. Cl.
*G06Q 20/38* (2012.01)
*G06Q 20/36* (2012.01)
(Continued)

(52) U.S. Cl.
CPC ......... *G06Q 20/363* (2013.01); *G06Q 20/322* (2013.01); *G06Q 20/3674* (2013.01);
(Continued)

(58) Field of Classification Search
CPC .................................................. G06Q 20/3829
(Continued)

(56) References Cited

U.S. PATENT DOCUMENTS 10,977,590 B2 * 4/2021 Perry ...................... G06F 16/29
2006/0047847 A1 3/2006 Saccocio
(Continued)

OTHER PUBLICATIONS

International Search Report and Written Opinion dated Aug. 11, 2016 in PCT Application No. PCT/US2016/030903.
International Preliminary Report on Patentability dated Nov. 4, 2016 in Application No. PCT/US2016/030903.

*Primary Examiner* — Chinedu C Agwumezie
(74) *Attorney, Agent, or Firm* — Thomas | Horstemeyer, LLP

(57) ABSTRACT

A system may identify a purchase transaction request from a merchant application and generate an in-app payment cryptogram for the purchase transaction request based on a limited use payment credential (LUPC). The in-app payment cryptogram may be provided to the merchant application. The merchant application may transmit the in-app payment cryptogram to a merchant computing device. A request may be received from a payment network to update the LUPC. A security library may be executed to determine that the client device is secure. The execution of the security library may generate a device attestation response, and the device attestation response is transmitted to the payment network. An updated LUPC may be received from the payment network.

20 Claims, 7 Drawing Sheets

Related U.S. Application Data

(60) Provisional application No. 62/185,427, filed on Jun. 26, 2015.

(51) Int. Cl.
*G06Q 20/40* (2012.01)
*G06Q 20/32* (2012.01)

(52) U.S. Cl.
CPC ....... *G06Q 20/385* (2013.01); *G06Q 20/3829* (2013.01); *G06Q 20/409* (2013.01); *G06Q 2220/00* (2013.01)

(58) Field of Classification Search
USPC ..................................................... 705/71, 75
See application file for complete search history.

(56) References Cited

U.S. PATENT DOCUMENTS

| | | |
|---|---|---|
| 2013/0085944 A1 | 4/2013 | Fielder |
| 2014/0344153 A1* | 11/2014 | Raj .................... G06Q 20/3821 705/44 |
| 2015/0019443 A1 | 1/2015 | Sheets et al. |
| 2015/0200934 A1* | 7/2015 | Naguib ................. G06F 21/575 713/168 |
| 2015/0206131 A1* | 7/2015 | Phillips .................. G06Q 20/34 705/41 |
| 2015/0356560 A1* | 12/2015 | Shastry ................ G06Q 20/401 705/64 |
| 2018/0232722 A1* | 8/2018 | Wong ................... G06Q 20/327 |
| 2019/0124057 A1* | 4/2019 | Smirnoff ............... H04L 9/0897 |

* cited by examiner

SYSTEMS AND METHODS FOR IN-APPLICATION AND IN-BROWSER PURCHASES

CROSS-REFERENCE TO RELATED APPLICATIONS

This application is a continuation of, and claims priority to, co-pending U.S. Patent Non-provisional Application entitled "SYSTEMS AND METHODS FOR IN-APPLICATION PURCHASES," filed on Nov. 9, 2015 and assigned application Ser. No. 14/936,294, which claims priority to U.S. Provisional Application entitled "SYSTEMS AND METHODS FOR IN-APPLICATION PURCHASES," filed on Jun. 26, 2015 and assigned application No. 62/185,427, in which are incorporated by reference as if set forth herein in their entireties.

FIELD

The present disclosure relates to systems and methods for conducting in-application and in-browser purchases from user devices.

BACKGROUND

Modern consumers often shop online with increasing regularity. In fact, e-commerce comprises a significant portion of total sales for many merchants. The increase in e-commerce transactions may be attributable in part to convenience and the ease of completing transactions. However, as consumers become accustomed to the ease of online transacting, inconveniences or inefficiencies may frustrate consumers into abandoning purchases that they would otherwise complete. For example, a consumer may become frustrated when their purchase account card is out of reach or the page resets causing personal information already entered to be lost. Such seemingly small hurdles to completing the transaction may scuttle the purchase.

The availability of digital wallet applications increases as more users acquire digital devices. Digital wallets may streamline the payment protocol in some instances and avoid some of the potential pitfalls of traditional web transactions. However, stored transaction account information makes digital wallets and user devices prime targets for theft and fraud. Thus, the use of a digital wallet for in-application and/or in-browser purchases may present increased security risks.

SUMMARY

A system, method, and computer readable medium (collectively, the "system") is disclosed for in-application purchases executed from a browser or merchant application. The system may be configured to perform operations and/or steps comprising receiving a transaction request from a user device, and requesting an in-app cryptogram from a network software development kit (SDK) on the user device. The in-app cryptogram may include an unpredictable number, an application transaction counter (ATC), and a card verification result (CVR), and the ATC may be extracted from a limited use payment credential (LUPC). The system may transmit a token, a token expiry, and a token data block for an assessment by a payment network, with the token data block including the token, the token expiry, the ATC, and/or the in-app cryptogram. The system may further receive a request from the payment network to update the LUPC on the user device, and attest that the user device is secure in response to the request from the payment network to refresh the LUPC on the user device.

In various embodiments, the assessment by the payment network may include comparing a payment cryptogram to the in-app cryptogram with the payment cryptogram being calculated by the payment network. The payment network may approve a transaction in response to the payment cryptogram matching the in-app cryptogram. The system may be configured to perform further operations including generating a payment payload including the token, the token expiry, the ATC, and the in-app cryptogram; encrypting the payment payload using a merchant key; and transmitting, by the wallet provider, the payment payload to a merchant associated with the merchant key. The system may also compute at least one of a signature or a message authentication code on the payment payload using a wallet provider key. A refreshed LUPC may be received from the payment network in response to the attesting the user device is secure. The system may also receive a rejection in response to the attesting the user device is secure, and retry to refresh the LUPC in response to the receiving the rejection. The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

DETAILED DESCRIPTION

The detailed description of various embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

As used herein, a "digital wallet" includes software and/or an electronic device that facilitates individual e-commerce and m-commerce transactions. The digital wallet may operate by aggregating the transaction account holder's payment and billing information and serving as the merchant of record, and/or passing through the transaction account holder's payment and billing information to the end merchant. Examples of digital wallets currently available include Apple Pay®, Passbook®, and Google Wallet™.

The present disclosure provides a system, method, and computer program product for conducting online transactions with in-application purchases. The security of the user device from which the in-application transactions are requested may be verified and attested to. The risk factors of a given transaction may also be evaluated. A favorable risk score may result in a transaction moving forward, and an unfavorable risk score may result in terminating the transaction or a request for additional authentication. The systems in the present disclosure may enable communication of sensitive information across a public network to complete in-app transactions. Applications of the present disclosure may thus enhance security of digital wallet transactions, enhance the user experience, and expedite processing.

Figure 1:
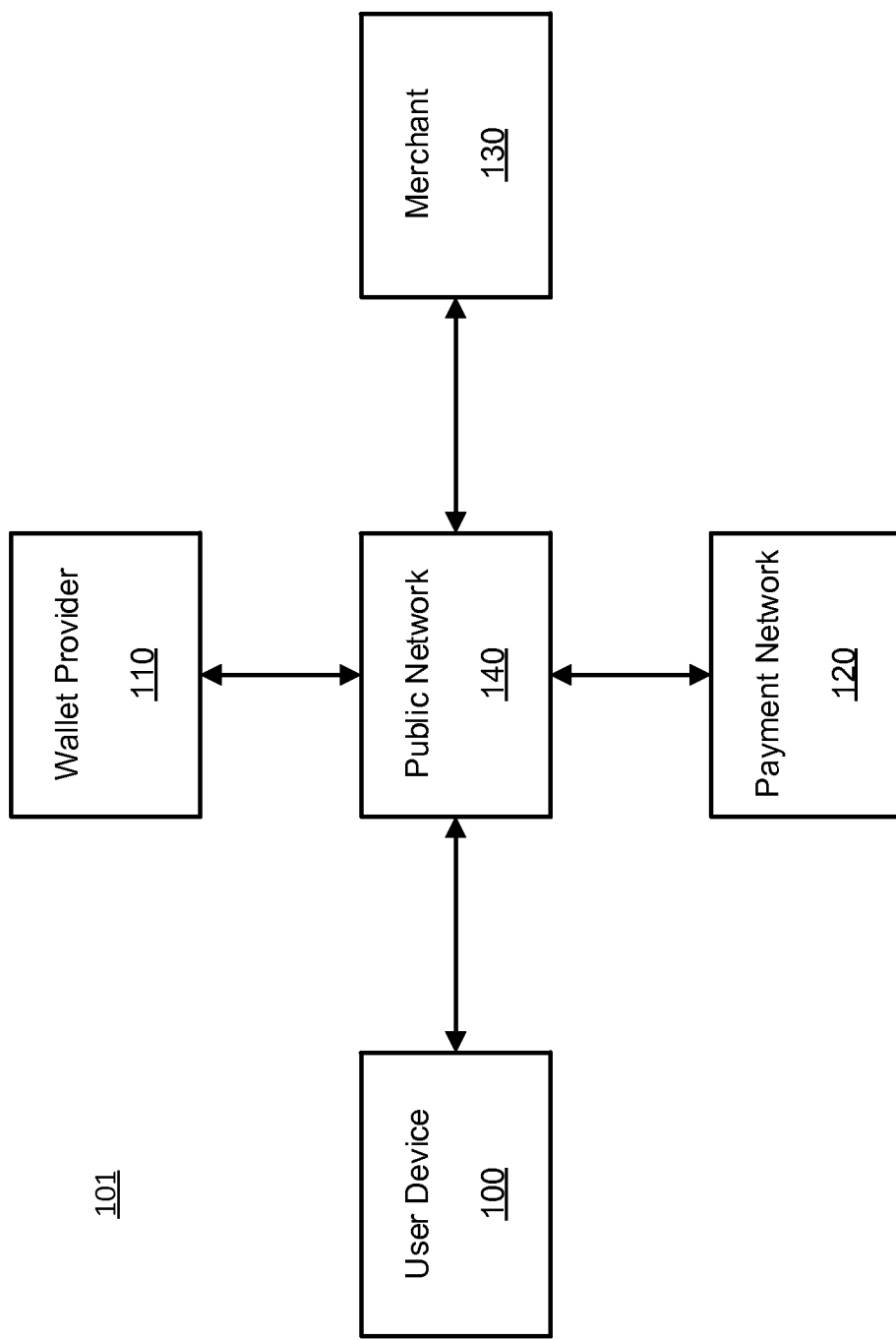
FIG. 1 illustrates an exemplary system for carrying out in-application transactions, in accordance with various embodiments.

With reference to FIG. 1, system 101 for conducting in-application transactions is shown, in accordance with various embodiments. System 101 may comprise a user device 100. User device 100 may be any device capable of receiving and/or displaying data (e.g., an electronic message via public network 140). For example, user device 100 may take the form of a computer or processor, or a set of computers/processors, although other types of computing units or systems may be used, including laptops, notebooks, hand held computers, personal digital assistants, cellular phones, smart phones (e.g., iPhone®, BlackBerry®, Android®, etc.) tablets, wearables (e.g., smart watches, fitness trackers, and smart glasses), or any other device capable of receiving data over public network 140. Moreover, a user device may not include a physical device, but may include software, data or other ways to receive and/or display information, or software on other devices.

As used herein, the term "network" includes any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., iPhone®, Blackberry®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, Appletalk, IP-6, NetBIOS, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

A network may be unsecure. Thus, communication over the network may utilize data encryption. Encryption may be performed by way of any of the techniques now available in the art or which may become available—e.g., Twofish, RSA, AES, El Gamal, Schorr signature, DSA, PGP, PKI, TDEA, ECC, GPG (GnuPG), and symmetric and asymmetric cryptosystems.

Figure 2:
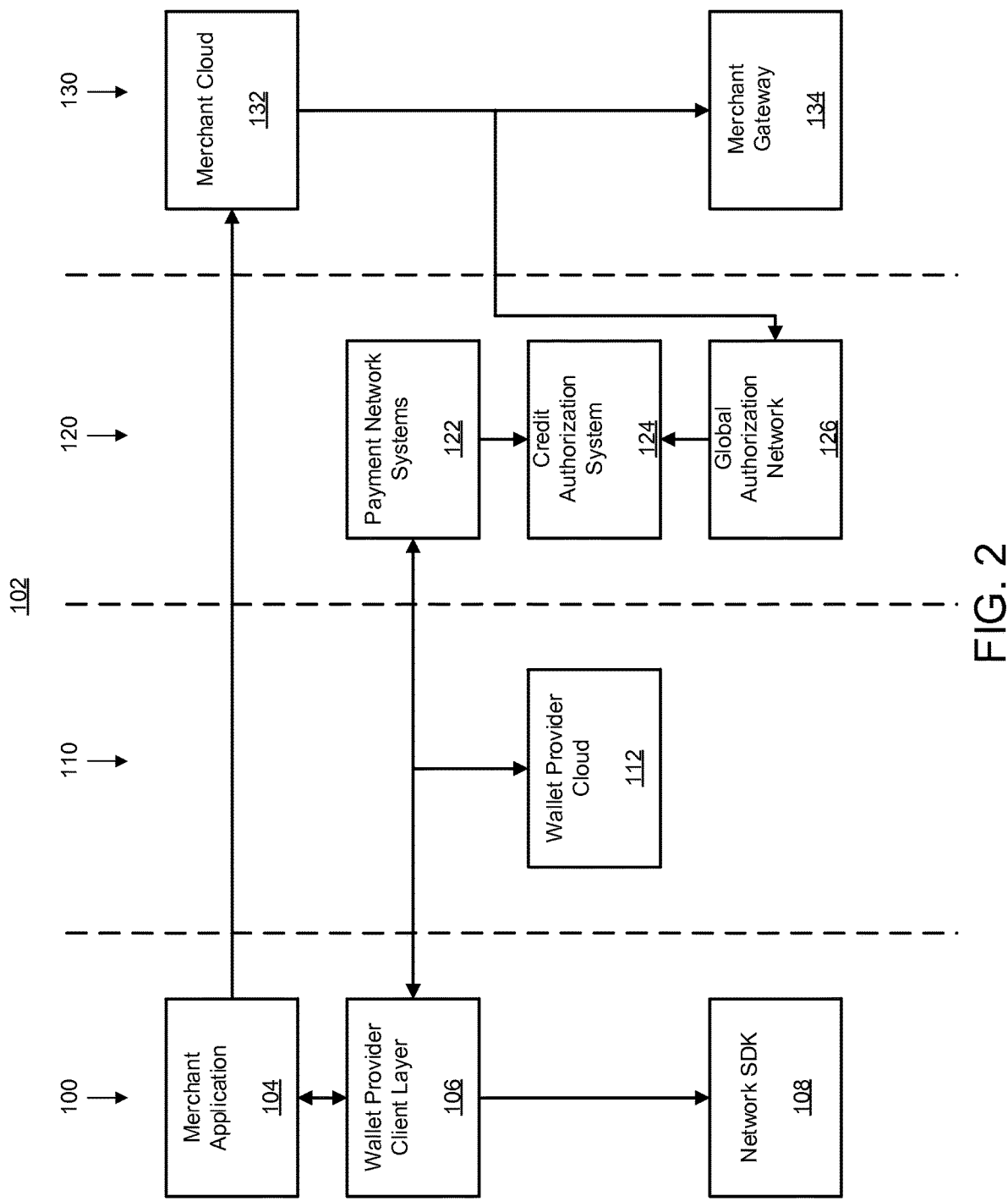
FIG. 2 illustrates exemplary software and hardware components in communication for carrying out in-application transactions, in accordance with various embodiments.

In various embodiments, user device 100 may initiate transactions from a web browser or merchant application. User device 100 may securely communicate over public network 140 with wallet provider 110, payment network 120, and merchant 130 to partially or fully complete the transactions. With reference to FIG. 2, system 102 for conducting in-app transactions is shown, in accordance with various embodiments. User device 100 may run a merchant application 104. Merchant application may be provided by merchant 130 and may be made available to users for download and execution on user device 100. Merchant application 104 may make in-application purchases available to a user.

In various embodiments, user device 100 may also comprise a wallet provider client layer 106. Wallet provider client layer 106 may be provided by wallet provider 110 to enable communication and/or interaction between merchant application 104 (as well as other applications) and a digital wallet on user device 100. In that regard, wallet provider 110 may execute steps on user device 100 via wallet provider client layer 106. A network software development kit 108 (SDK) may also be available on user device 100. The network SDK 108 may provide functionality on user device 100 for interaction with payment network 120 such as, for example, token data parsing, data extraction from LUPCs, and/or generation of cryptograms. For example, network SDK 108 may return numbers such as an unpredictable number (UN) and/or an application transaction counter (ATC) from a limited use payment credentials or other session key in response to a function call. The ATC and UN may be used subsequently to authenticate a payment.

In various embodiments, network SDK 108 may be partially or wholly integrated into a security chip or otherwise integrated into dedicated hardware located on user device 100. For example, network trusted app may comprise a trusted execution environment (TEE) on a chip, using chip emulation, and/or both. The TEE may secure sensitive information such as encryption keys and session keys to enhance security of user device 100. Network SDK 108 may provide interface tools with decryption and/or encryption services to securely store LUPCs on user device 100.

In various embodiments, wallet provider 110 may communicate over public network 140 using wallet provider cloud 112. Wallet provider cloud 112 may provide backend services for wallet provider client layer 106 of user device 100. Wallet provider cloud 112 may include one or more computer or processor, or a set of computers/processors, capable of receiving data over public network 140. "Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. A cloud may include one or more servers. Cloud computing may include location-independent computing, whereby shared servers provide resources, software, and data to computers and other devices on demand. For more information regarding cloud computing, see the NIST's (National Institute of Standards and Technology) definition of cloud computing at http://csrc.nist.gov/publications/nistpubs/800-145/SP800-145.pdf (last visited June 2012), which is hereby incorporated by reference in its entirety. For example, wallet provider cloud 112 may comprise a network of servers pooling processing, communication, and storage resources to complete in-app transactions.

In various embodiments, the payment network 120 may include payment network systems 122. Payment network systems 122 may be similar in structure to wallet provider cloud 112 described above. Payment network systems 122 may provide processing and storage for a transaction account network. For example, payment network systems 122 may conduct risk assessments on in-app transactions and terminate transactions with unacceptable risk of fraud. Payment network systems 122 may communicate with credit authorization system 124 (CAS). CAS 124 may provide approval for requested transactions that successfully meet the security standards disclosed herein. A global authorization network (GAN) 126 may also be in communication with CAS 124. GAN 126 may receive requests from merchant gateway 134 of merchant 130 and forward requests to CAS 124 for approval. Merchant 130 may have merchant cloud 132 in communication with merchant application 104 to provide backend services to merchant application 104. Merchant cloud 132 may be similar in structure to wallet provider cloud 112 described above.

Figure 3:
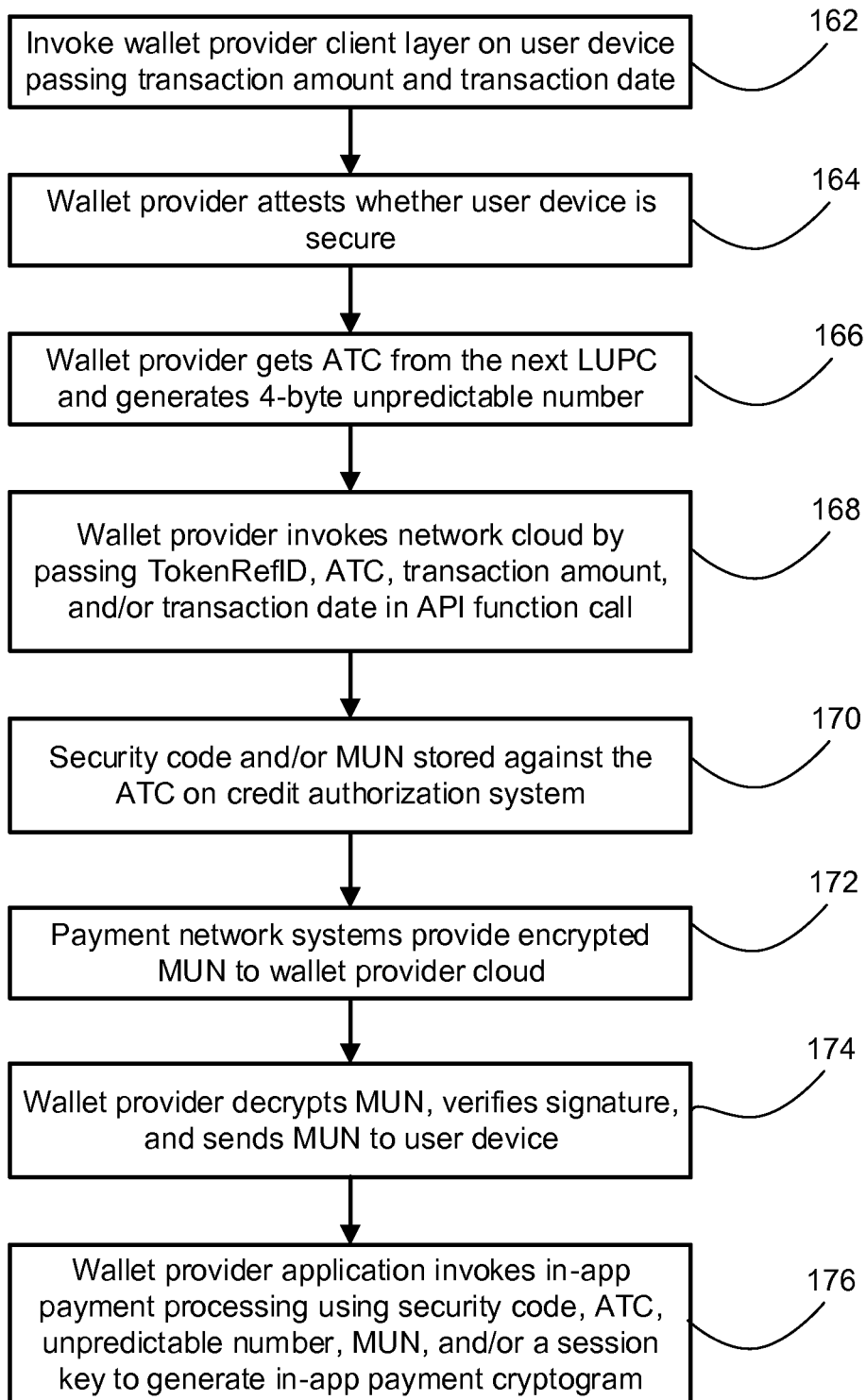
FIG. 3 illustrates a process for initiating an in-application transaction, in accordance with various embodiments.

With reference to FIG. 3, a process 160 for initiating an in-app transaction (e.g., purchase) on system 102 is shown, in accordance with various embodiments. A user may request an in app purchase using user device 100. For example, a user may select an item for purchase and select a checkout button. Wallet provider client layer 106 is invoked on user device 100 by passing a transaction date and a transaction amount from merchant application 104 to wallet provider client layer 106 in response to the user request (Step 162). Wallet provider client layer 106 may provide a list of active provisioned cards and/or accounts for a user to pay with. The user may select a card or account and authenticate with wallet provider 110. Wallet provider 110 may attest whether user device 100 is secure (Step 164).

In order to attest that a device is secure, wallet provider 110 may check whether user device 100 has been compromised in any way. For example, wallet provider 110 may evaluate whether user device 100 has been rooted or jailbroken, has malware or viruses, or is otherwise prone to security breaches. Wallet provider 110 may execute a function call to a security library installed on user device 100 to detect irregularities that ray indicate the user device has been compromised. If wallet provider 110 determined that user device 100 poses an unacceptable security threat then wallet provider 110 may abort the transaction. In such an instance, user device 100 may not be used to complete the in-app purchase.

In various embodiments, wallet provider 110 may get an ATC from the next limited use purchase credential (LUPC) and generate a 4-byte unpredictable number (Step 166). The LUPC may be a one-time use key or a session key used to authorize purchases using a digital wallet. The wallet provider may get an ATC by invoking a function on the network SDK 108. Network SDK 108 may comprise an application programming interface (API) with a function (e.g., getTransactionCounter) that, when called by wallet provider client layer 106, returns an ATC. The unpredictable number may be at least partially randomly generated on wallet provider cloud 112 and may be a hex-encoded, 4-byte number, as detailed in the EMV 4.3 specification available at http://www.emvco.com/default.aspx, which is incorporated by reference herein.

In various embodiments, wallet provider cloud 112 may execute a function on payment network systems 122 using an API interface to request a modified unpredictable number. In that regard, wallet provider 110 invokes the function on payment network systems 122 by passing token reference id, the ATC, the unpredictable number (UN), the transaction amount, the transaction date, and other risk assessment variables in an API function call (Step 168). The token reference id may identify a token generated as a surrogate value for a purchase account number and stored on user device 100.

In various embodiments, payment network systems 122 may perform a risk assessment at least partially based on the inputs passed by wallet provider 110 in the function call and other transaction parameters. The risk assessment may evaluate the values received from wallet provider 110 to the expected values or acceptable values. Payment network systems 122 may also consider factors such as the age of the token on user device 100, the a separate risk assessment by wallet provider 110, the user's history, the duration the user has been associated with the wallet provider, transaction amount, recent transactions, device attributes, device location, or other indicia of trustworthiness. The risk assessment may return a security code reflective of the risk posed by the transaction. The security code may thus effectively represent a risk score. The security may be used to modify the unpredictable number using any binary operator to create the MUN. In that regard, the MUN may store the state of the risk assessment as the MUN may be the UN encoded with the security code. The MUN may be generated by the payment network in advance of an authorization request. The security code and/or the MUN may be stored against the ATC on CAS 124 (Step 170).

Payment network systems 122 may provide the encrypted MUN to wallet provider cloud 112 (Step 172). Wallet provider 110 may decrypt the MUN, verify the signature and send the MUN to user device 100 (Step 174). Wallet provider client layer 106 may receive the above data from wallet provider cloud 112. Wallet provider client layer 106 may invoke in-app payment processing using one or more of security code, ATC, unpredictable number. MUN, and/or a session key to generate in-app payment cryptogram (Step 176).

Figure 4:
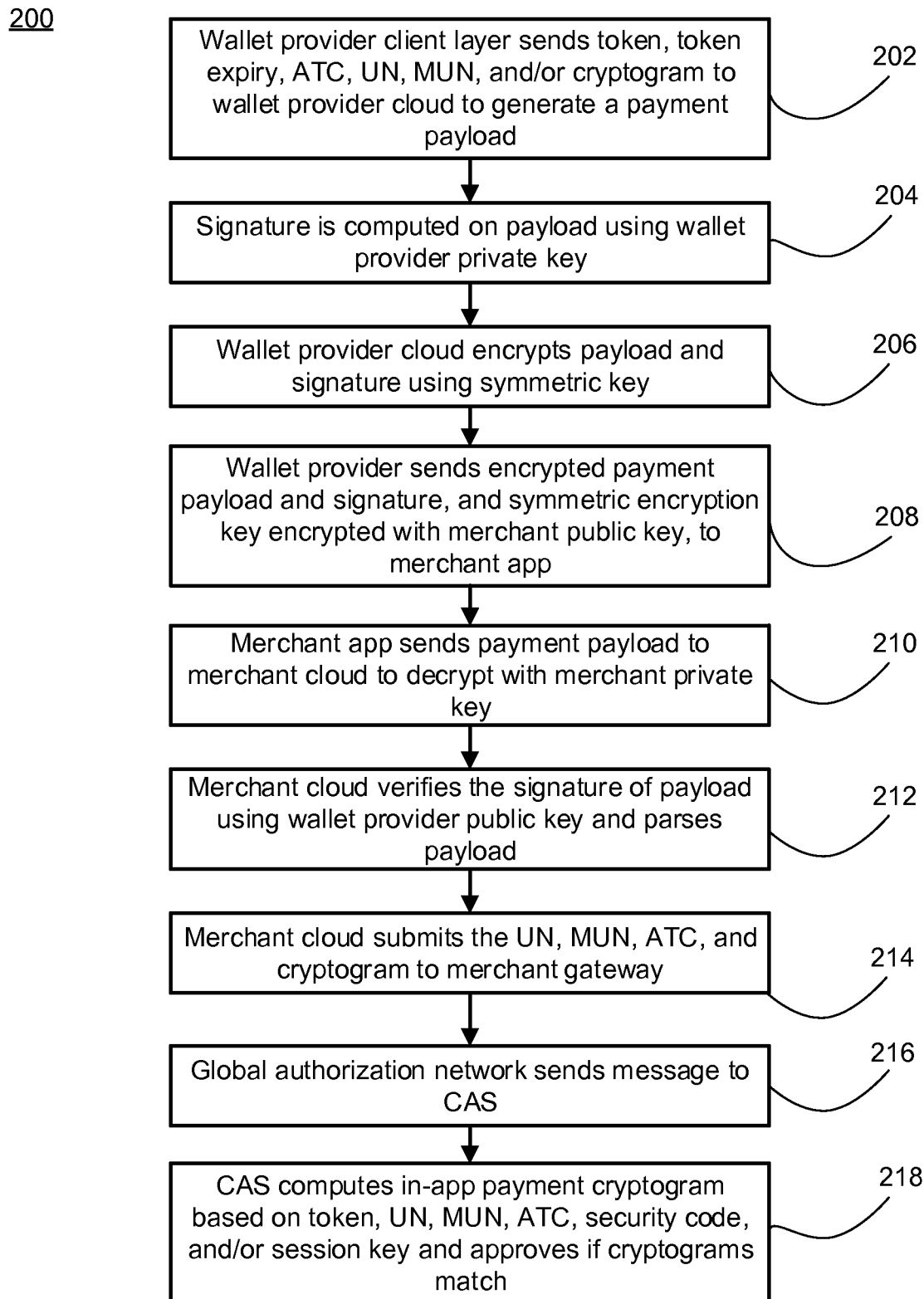
FIG. 4 illustrates a process for completing an in-application transaction, in accordance with various embodiments.

With reference to FIG. 4, process 200 for completing an in-app purchase is shown, in accordance with various embodiments. Wallet provider client layer 106 may send a token, token expiry, ATC, unpredictable number, MUN, and/or cryptogram to wallet provider cloud to generate a payment payload (Step 202). Wallet provider cloud 112 may generate the payment payload by appending the token, token expiry, unpredictable number, MUIN, and/or ATC to the in-app payment cryptogram that was generated in Step 176.

In various embodiments, wallet provider cloud 112 may compute a signature on the payment payload using a private key of wallet provider 110 (Step 204). The private key may be an RSA 2048 bit private key that is 2048 bits long, for example. Other private keys may also be used in place of an RSA 2048 bit key, including a longer or shorter RSA private key or other type of private key used in a suitable asymmetric cryptography protocol. The public key matching the private key may thus later used to decipher the encrypted data or for signature verification.

In various embodiments, wallet provider cloud 112 may encrypt the payment payload and its signature using an encryption key (Step 206). The encryption key and algorithm used may be any type of encryption key known to those having ordinary skill in the art. The encryption key may be, for example, random AES 128 bit key. The AES 128 bit key may be a symmetric key to enable decryption with the same key by an intended recipient of the AES 128 bit key and encrypted payload. Wallet provider cloud 112 may send the encrypted payment payload and signature, as well as the symmetric encryption key, encrypted by a merchant public key, to merchant application 104 (Step 208). The merchant public key may be merchant RSA 3072 bit key, for example. The encrypted signature, encrypted payment payload, and encrypted symmetric encryption key may be delivered to merchant application 104 by wallet provider client layer 106. Merchant application 104 running on user device 100 may send the payment payload to merchant cloud 132 for decryption with the merchant private key (Step 210). The merchant private key may be a RSA 3072 bit key, for example. After deciphering the wallet provider signature, merchant cloud 132 may verify the signature of the payment payload using the wallet provider public key and parse the payment payload (Step 212). The wallet provider public key may be, for example, a RSA 2048 bit key. If the signature is correct the transaction may continue processing.

In various embodiments, parsing the payment payload may include extracting the token, token expiry, unpredictable number, MUN, ATC, and/or in-app payment cryptogram from the payment payload. The merchant cloud may submit the unpredictable number, the MUN, the ATC, and/or the cryptogram to merchant gateway 134 (Step 214). Merchant gateway 134 may further submit the unpredictable number, the ATC, the cryptogram, and other elements to CAN 126. GAN 126 may send the message to CAS 124 (Step 216).

In various embodiments, CAS 124 may compute the in-app payment cryptogram based on the token, unpredictable number, MUN, ATC, security code, and/or session key and approve the transaction if the cryptograms match and the security risk is acceptable (Step 218). CAS 124 may check each bit of the calculated in-app payment cryptogram to verify an exact match with the cryptogram provided in the payment payload. The risk assessment performed in response to Step 168 may be analyzed at CAS 124 to determine whether the transaction possess an acceptable risk prior to issuing an authorization. Risk assessment analysis may be conducted using the MUN, the security code output from the risk assessment, and/or the UN. If a transaction poses an unacceptable risk based on the risk assessment CAS 124 may decline the transaction.

Figure 5:
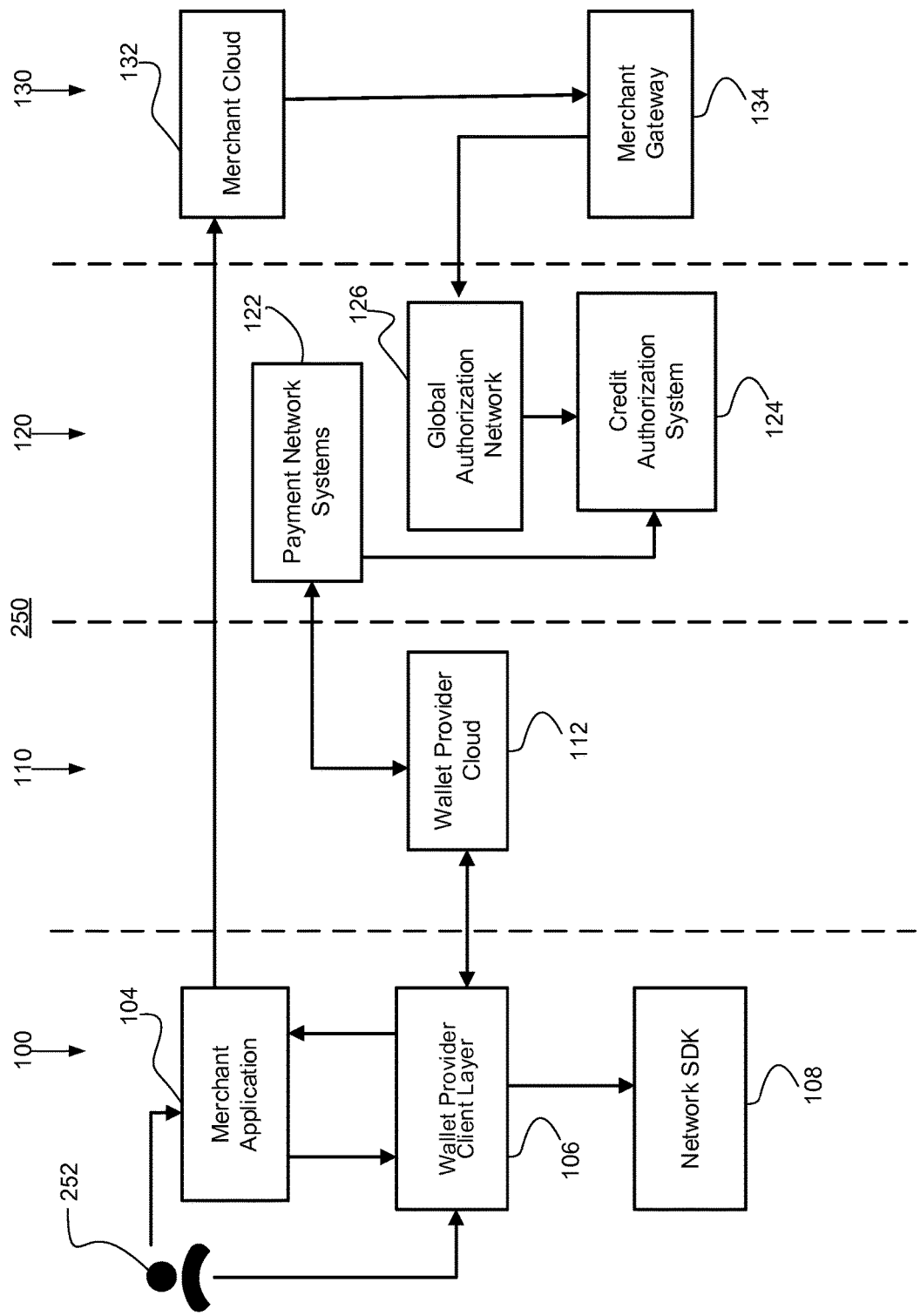
FIG. 5 illustrates exemplary software and hardware components in communication for carrying out in-application transactions, in accordance with various embodiments.
Figure 6A:
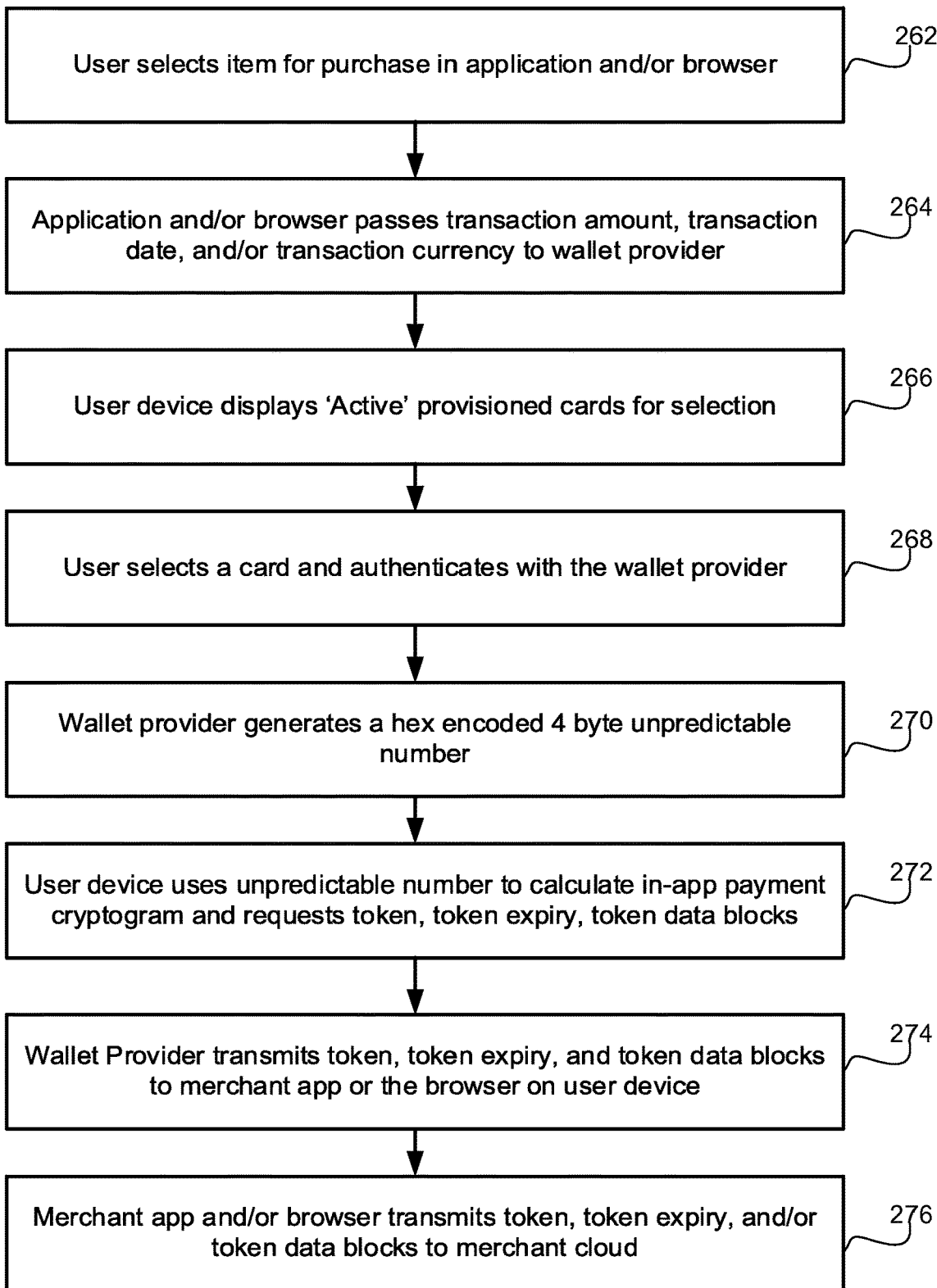
FIG. 6A-6B illustrates a process for completing in-application and/or in-browser transactions using limited use purchase credentials, in accordance with various embodiments.

With reference to FIGS. 5 and 6A, an exemplary process 260 for completing in-application and/or in-browser transactions on system 250 is shown, in accordance with various embodiments. Process 600 may be similar to process 160 and process 200 disclosed above in terms of payment payload distribution and encryption. Process 260 may differ from process 160 and process 200 by variation step ordering, as well as variation in the steps themselves. For example, process 260 may not rely on a modified unpredictable number as disclosed above. System 250 may also be similar to system 102 with varying communication structure.

In various embodiments, a user 252 may select an item for purchase on merchant application 104 and may select checkout (Step 262). The merchant app may be a native application, a web application, and/or a web site accessible by user device 100. In that regard, the checkout experience may be accessed by user 252 through a web browser.

In various embodiments, merchant application 104 invokes wallet provider client layer 106, and passes transaction details such as transaction amount, transaction date, and/or transaction currency to wallet provider client layer 106, in response to user 252 selecting checkout (Step 264). Wallet, provider client layer 106 displays the list of 'Active' provisioned cards available on user device 100 for user 252 to select a card for payment (Step 266).

In various embodiments, user 252 selects a card and user device 100 authenticates with the wallet provider cloud 112 (Step 268). Wallet provider cloud 112 may choose any form of authentication specific to wallet provider 110. For example, wallet provider 110 may use passwords, pins, fingerprints, facial recognition, biometrics, and/or other suitable authentication techniques.

In various embodiments, wallet provider 110 may generate an unpredictable number (Step 270). The unpredictable number may be a random, hex encoded number. The unpredictable number may have a predetermined length. For example, the unpredictable number may be 4 bytes long. The unpredictable number may be used in subsequent steps to enhance transaction security. The unpredictable number may be at least partially randomly generated on wallet provider cloud 112 and may be a hex-encoded, 4-byte number, as detailed in the EMV 4.3 specification available at http://www.emvco.com/default.aspx, which is incorporated by reference herein.

In various embodiments, wallet provider client layer 106 may invoke a function on user device 100 using the unpredictable number (from step 270) to calculate an in-app payment cryptogram and retrieve additional data including token, token expiry, and/or any token data blocks (Step 272). The function may be used to generate an in-app payment cryptogram for processing an in-application or in-browser transaction. An in-app payment cryptogram may be calculated using the unpredictable number, an ATC (retrieved from an LUPC), and card verification results (CVR). Thus, the in-app payment cryptogram may be an 8 byte cryptogram including the unpredictable number, the ATC, and/or the CVR. A token data block may include a cryptogram reference ID, the in-app cryptogram, the unpredictable number, the ATC, the CVR, a derivation key index (DKI, also retrieved from an LUPC), a primary account number (PAN) sequence, and/or a predetermined number of hex 0s. For example, a first token data block may include a cryptogram reference ID, the in-app cryptogram, unpredictable number, ATC, CVR, DKI, PAN sequence and have a total length of 20 bytes. A second token data block may include 20 bytes of hex 0s. A DKI may comprise data for identifying a derivation key. The derivation key may be used in deriving a master key, for example. Wallet provider 110 (using wallet provider client layer 106 and/or wallet provider cloud 112) may also generate a payment payload by appending the token, token expiry, unpredictable number, and/or ATC to the in-app payment cryptogram that was generated in step 272.

In various embodiments, wallet provider client layer 106 may provide the token, token expiry, and/or token data blocks (from step 272) to merchant application 104 running on user device 100 (Step 274). The token data blocks include the in-app payment cryptogram calculated in step 272 for later comparison to a separately generated payment cryptogram. Merchant application 104 may transmit the token, token expiry, and/or token data blocks (from step 274) to merchant cloud 132 (Step 276).

Figure 6B:
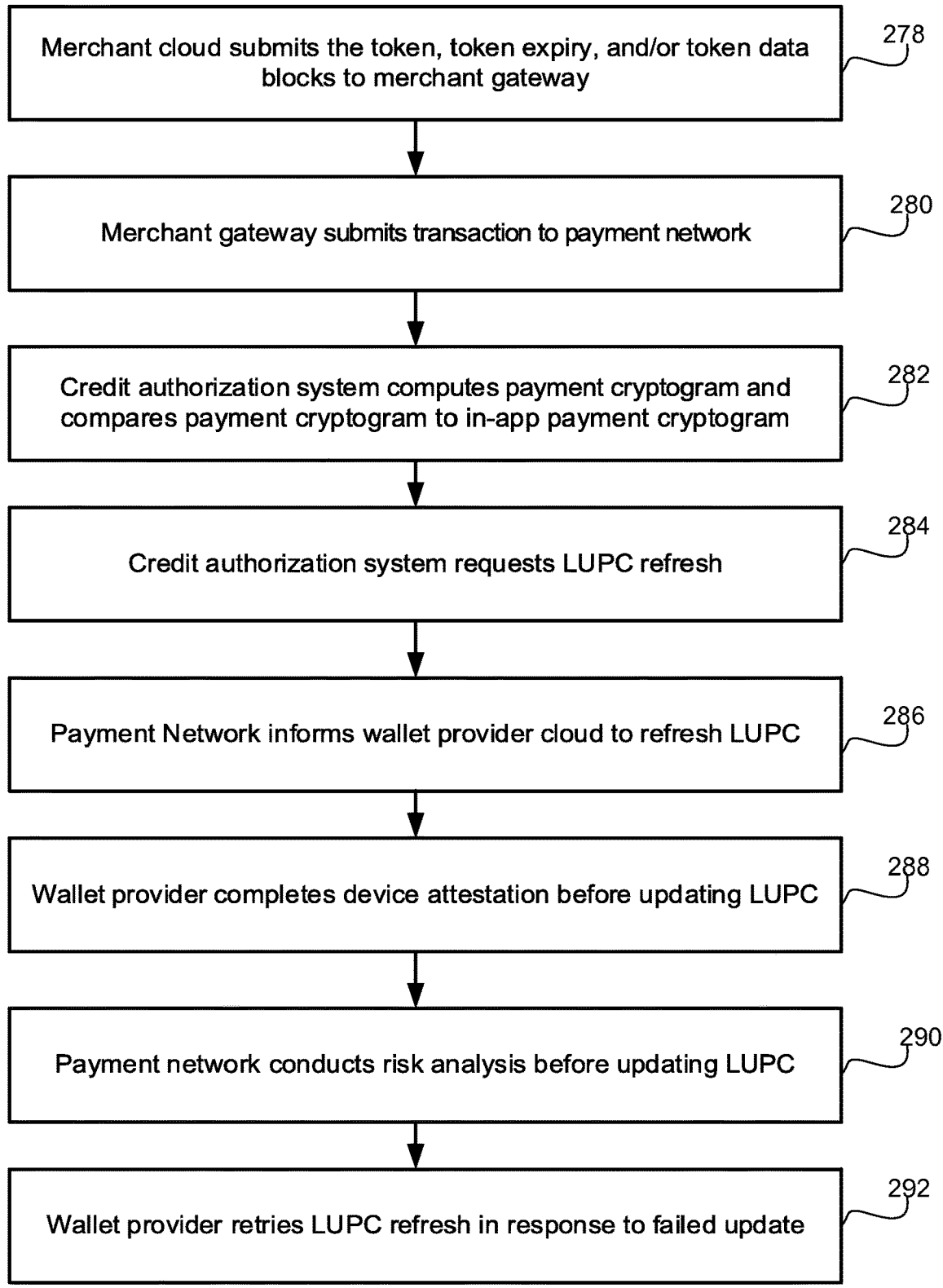

Continuing with reference to FIGS. 5 and 6B, merchant cloud 132 may submit the token, token expiry, and/or token data blocks along with other payment attributes such as a payment payload to merchant gateway 134 (Step 278). Merchant gateway 134 may submit the transaction to the global authorization network 126 (Step 280). Payment network 120 may compute the payment cryptogram and compare the computed payment cryptogram to the in-app payment cryptogram. Payment network 120 may approve the transaction, in response to the cryptogram matching and a risk assessment passing (Step 282).

In various embodiments, payment network systems 122 may perform the risk assessment at least partially based on the token, token expiry, cryptogram reference ID, the in-app cryptogram, the unpredictable number, the ATC, the CVR, a derivation key index (DKI), a primary account number (PAN) sequence, transaction amount, transaction location, and/or other transaction parameters. The risk assessment may compare the values received to expected values and/or acceptable values. Payment network systems 122 may also consider factors such as the age of the token on user device 100, the separate risk assessment by wallet provider 110, the user's history, the duration the user has been associated with the wallet provider, transaction amount, recent transactions, device attributes, device location, and/or other indicia of trustworthiness. The risk assessment may return a security code reflective of the risk posed by the transaction. The security code may thus effectively represent a risk score.

In various embodiments, payment network 120 may request that user device 100 refresh the LUPCs on user device 100, in response to risk assessment results (Step 284). The request may be issued after authorizing and/or declining a transaction. A refresh request may impact future in-app transactions by increasing the risk threshold for approval in response to a pre-refresh LUPC being used. For example, a transaction of $1.50 may be approved using an old LUPC after a refresh request, but a $20.00 transaction may be declined using the old LUPC. Payment network systems 122 may direct wallet provider cloud 112 to refresh LUPCs (Step 286).

In various embodiments, wallet provider cloud 112 may complete device attestation of user device 100 and, on successful attestation, invoke wallet provider to complete device attestation (Step 288. In order to attest that a device is secure, as disclosed above, wallet provider 110 may check whether user device 100 has been compromised in any way. For example, wallet provider 110 may evaluate whether user device 100 has been rooted or jailbroken, has malware or viruses, or is otherwise prone to security breaches. Wallet provider 110 may execute a function call to a security library installed on user device 100 to detect irregularities that may indicate the user device 100 has been compromised. If wallet provider 110 determined that user device 100 poses an unacceptable security threat wallet provider 110 may abort the LUPC refresh.

In various embodiments, payment network 120 may conduct a risk analysis and, depending on the outcome, provide refreshed LUPCs and/or reject the LUPC request (Step 290).

For example, if the risk analysis indicates a high risk, payment network 120 may reject the request. If the wallet provider client layer 106 does not receive the updated LUPC, then future in-application and/or in-browser purchases may be declined, as the existing LUPC may be recognized as no longer valid for completing in-app transactions. In-app transactions may thus be frozen in response to LUPC refresh failing. Wallet provider 110 may provide retry parameters to update LUPCs securely at a later time (Step 292). In that regard, LUPC updates may be approved or denied based on device attestation and risk assessment. Payment network 120 may effectively force wallet provider 110 and/or user device 100 to complete device attestation in order to refresh LUPCs and continue using the in-application or in-browser transaction system.

As used herein, "match" or "associated with" or similar phrases may include an identical match, a partial match, meeting certain criteria, matching a subset of data, a correlation, satisfying certain criteria, a correspondence, an association, an algorithmic relationship and/or the like. Similarly, as used herein, "authenticate" or similar terms may include an exact authentication, a partial authentication, authenticating a subset of data, a correspondence, satisfying certain criteria, an association, an algorithmic relationship and/or the like.

Any communication, transmission and/or channel discussed herein may include any system or method for delivering content (e.g. data, information, metadata, etc.), and/or the content itself. The content may be presented in any form or medium, and in various embodiments, the content may be delivered electronically and/or capable of being presented electronically. For example, a channel may comprise a website or device (e.g., Facebook, YOUTUBE®, APPLE®TV®, PANDORA®, XBOX®, SONY®, PLAYSTATION®), a uniform resource locator ("URL"), a document (e.g., a MICROSOFT®, Word® document, a MICROSOFT® Excel® document, an ADOBE® .pdf document, etc.), an "ebook," an "emagazine," an application or microapplication (as described herein), an SMS or other type of text message, an email, facebook, twitter, MMS and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network and/or location based service. Distribution channels may include at least one of a merchant website, a social media site, affiliate or partner websites, an external vendor, and a mobile device communication. Examples of social media sites include FACEBOOK®, FOURSQUARE®, TWITTER®, MYSPACE®, LINKEDIN®, and the like. Examples of affiliate or partner websites include AMERICAN EXPRESS®, GROUPON®, LIVINGSOCIAL®, and the like. Moreover, examples of mobile device communications include texting, email, and mobile applications for smartphones.

The phrases consumer, customer, user, transaction account holder, card member or the like shall include any person, entity, business, government organization, business, software, hardware, machine associated with a transaction account, buys merchant offerings offered by one or more merchants using the account and/or who is legally designated for performing transactions on the account, regardless of whether a physical card is associated with the account. For example, the card member may include a transaction account owner, a transaction account user, an account affiliate, a child account user, a subsidiary account user, a beneficiary of an account, a custodian of an account, and/or any other person or entity affiliated or associated with a transaction account.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS® NT®, WINDOWS® 95/98/2000®, WINDOWS® XP®, WINDOWS® Vista®, WINDOWS® 7®, OS2, UNIX®, LINUX®, SOLARIS®. MacOS, etc.) as well as various conventional support software and drivers typically associated with computers.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations. Useful machines for performing the various embodiments include general purpose digital computers or similar devices.

In fact, in various embodiments, the embodiments are directed toward one or more computer systems capable of carrying out the functionality described herein. The computer system includes one or more processors, such as processor. The processor is connected to a communication infrastructure (e.g., a communications bus, cross over bar, or network). Various software embodiments are described in term of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

Computer system also includes a main memory, such as for example random access memory (RAM), and may also include a secondary memory. The secondary memory may include, for example, a hard disk drive and/or a removable storage drive, representing a floppy disk drive, a magnetic tape drive, an optical disk drive, etc. The removable storage drive reads from and/or writes to a removable storage unit in a well-known manner. Removable storage unit represents a floppy disk, magnetic tape, optical disk, etc. which is read by and written to by removable storage drive. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

Computer system may also include a communications interface. Communications interface allows software and data to be transferred between computer system and external devices. Examples of communications interface may include a modem, a network interface (such as an Ethernet account), a communications port, a Personal Computer Memory Account International Association (PCMCIA) slot and account, etc. Software and data transferred via communications interface are in the form of signals which may be electronic, electromagnetic, optical or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

The terms "computer program medium" and "computer usable medium" and "computer readable medium" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs). Implementation of the hardware state machine so as to perform the functions described herein will be apparent to persons skilled in the relevant art(s).

In various embodiments, the server may include application servers (e.g. WEB SPHERE, WEB LOGIC, and JBOSS). In various embodiments, the server may include web servers (e.g. APACHE, IIS, GWS, SUN JAVA® SYSTEM WEB SERVER).

A web client includes any device (e.g., personal computer) which communicates via any network, for example such as those discussed herein. Such browser applications comprise Internet browsing software installed within a computing unit or a system to conduct online transactions and/or communications. These computing units or systems may take the form of a computer or set of computers, although other types of computing units or systems may be used, including laptops, notebooks, tablets, hand held computers, personal digital assistants, set-top boxes, workstations, computer-servers, main frame computers, mini-computers, PC servers, pervasive computers, network sets of computers, personal computers, such as IPADS®, IMACS®, and MACBOOKS®, kiosks, terminals, point of sale (POS) devices and/or terminals, televisions, or any other device capable of receiving data over a network. A web-client may run MICROSOFT® INTERNET EXPLORER®, MOZILLA® FIREFOX®, GOOGLE® CHROME®, APPLE® Safari, or any other of the myriad software packages available for browsing the internet.

Practitioners will appreciate that a web client may or may not be in direct contact with an application server. For example, a web client may access the services of an application server through another server and/or hardware component, which may have a direct or indirect connection to an Internet server. For example, a web client may communicate with an application server via a load balancer. In various embodiments, access is through a network or the Internet through a commercially-available web-browser software package.

As those skilled in the art will appreciate, a web client includes an operating system (e.g., WINDOWS® NT), 95/98/2000/CE/Mobile, OS2, UNIX®, LINUX®, SOLARIS®, MacOS, etc.) as well as various conventional support software and drivers typically associated with computers. A web client may include any suitable personal computer, network computer, workstation, personal digital assistant, cellular phone, smart phone, minicomputer, mainframe or the like. A web client can be in a home or business environment with access to a network. In various embodiments, access is through a network or the Internet through a commercially available web-browser software package. A web client may implement security protocols such as Secure Sockets Layer (SSL) and Transport Layer Security (TLS). A web client may implement several application layer protocols including http, https, ftp, and sftp.

In various embodiments, components, modules, and/or engines of system 102 may be implemented as micro-applications or micro-apps. Micro-apps are typically deployed in the context of a mobile operating system, including for example, a WINDOWS® mobile operating system, an ANDROID® Operating System, APPLE® IOS®, a BLACKBERRY® operating system and the like. The micro-app may be configured to leverage tie resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

The various system components may be independently, separately or collectively suitably coupled to the network via data links which includes, for example, a connection to an Internet Service Provider (ISP) over the local loop as is typically used in connection with standard modem communication, cable modem, Dish Networks®, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

As used herein, "transmit" may include sending electronic data from one system component to another over a network connection. Additionally, as used herein, "data" may include encompassing information such as commands, queries, files, data for storage, and the like in digital or any other form.

The system contemplates uses in association with web services, utility computing, pervasive and individualized computing, security and identity solutions, autonomic computing, cloud computing, commodity computing, mobility and wireless solutions, open source, biometrics, grid computing and/or mesh computing.

Any databases discussed herein may include relational, hierarchical, graphical, or object-oriented structure and/or any other database configurations. Common database products that may be used to implement the databases include DB2 by IBM® (Armonk, N.Y.), various database products available from ORACLE® Corporation (Redwood Shores, Calif.), MICROSOFT® Access® or MICROSOFT® SQL Server® by MICROSOFT® Corporation (Redmond, Wash.), MySQL by MySQL AB (Uppsala, Sweden), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

The computers discussed herein may provide a suitable website or other Internet-based graphical user interface which is accessible by users. In one embodiment, the MICROSOFT® INTERNET INFORMATION SERVICES® (IIS), MICROSOFT® Transaction Server (MTS), and MICROSOFT® SQL Server, are used in conjunction with the MICROSOFT® operating system, MICROSOFT® NT web server software, a MICROSOFT® SQL Server database system, and a MICROSOFT® Commerce Server. Additionally, components such as Access or MICROSOFT® SQL Server, ORACLE®, Sybase, Informix MySQL, Interbase, etc., may be used to provide an Active Data Object (ADO) compliant database management system. In one embodiment, the Apache web server is used in conjunction with a Linux operating system, a MySQL database, and the Perl, PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® APPLE®ts, JAVASCRIPT, active server pages (ASP), common gateway interface scripts (COI), extensible markup language (XML), dynamic HTML, cascading style sheets (CSS), AJAX (Asynchronous JAVASCRIPT And XML), helper applications, plug-ins, and the like. A server may include a web service that receives a request from a web server, the request including a URL and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the Internet server. Middleware may be configured to process transactions between the various components of an application server and any number of internal or external systems for any of the purposes disclosed herein. WEBSPHERE MQ™ (formerly MQSeries) by IBM®, Inc. (Armonk, N.Y.) is an example of a commercially available middleware product. An Enterprise Service Bus ("ESB") application is another example of middleware.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, JAVA®, JAVASCRIPT, VBScript, Macromedia Cold Fusion, COBOL, MICROSOFT® Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "JAVA® Cryptography" by Jonathan Knudson, published by O'Reilly & Associates (1998); (3) "Cryptography & Network Security: Principles & Practice" by William Stallings, published by Prentice Hall; all of which are hereby incorporated by reference.

As used herein, the term "end user", "consumer", "customer", "account member", "business" or "merchant" may be used interchangeably with each other, and each shall mean any person, entity, government organization, business, machine, hardware, and/or software. A bank may be part of the system, but the bank may represent other types of account issuing institutions, such as credit account companies, account sponsoring companies, or third party issuers under contract with financial institutions. It is further noted that other participants may be involved in some phases of the transaction, such as an intermediary settlement institution, but these participants are not shown.

As will be appreciated by one of ordinary skill in the art, the system may be embodied as a customization of an existing system, an add-on product, a processing apparatus executing upgraded software, a standalone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that, can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user WINDOWS®, webpages, websites, web forms, prompts, etc. Practitioners will appreciate that the illustrated steps described herein may comprise in any number of configurations including the use of WINDOWS®, webpages, web forms, popup WINDOWS®, prompts and the like. It should be further appreciated that the multiple steps as illustrated and described may be combined into single webpages and/or WINDOWS® but have been expanded for the sake of simplicity. In other cases, steps illustrated and described as single process steps may be separated into multiple webpages and/or WINDOWS® but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Phrases and terms similar to "account", "account number", "account code" or "consumer account" as used herein, may include any device, code (e.g., one or more of an authorization/access code, personal identification number ("PIN"). Internet code, other identification code, and/or the like), number, letter, symbol, digital certificate, smart chip, digital signal, analog signal, biometric or other identifier/indicia suitably configured to allow the consumer to access, interact with or communicate with the system. The account number may optionally be located on or associated with a rewards account, charge account, credit account, debit account, prepaid account, telephone account, embossed account, smart account, magnetic stripe account, bar code account, transponder, radio frequency account or an associated account.

The system may include or interface with any of the foregoing accounts, devices, and/or a transponder and reader (e.g. RFID reader) in RF communication with the transponder (which may include a fob), or communications between an initiator and a target enabled by near field communications (NFC). Typical devices may include, for example, a key ring, tag, account, cell phone, wristwatch or any such form capable of being presented for interrogation. Moreover, the system, computing unit or device discussed herein may include a "pervasive computing device," which may include a traditionally non-computerized device that is embedded with a computing unit. Examples may include watches, Internet enabled kitchen appliances, restaurant tables embedded with RF readers, wallets or purses with imbedded transponders, etc. Furthermore, a device or financial transaction instrument may have electronic and communications functionality enabled, for example, by: a network of electronic circuitry that is printed or otherwise incorporated onto or within the transaction instrument (and typically referred to as a "smart account"); a fob having a transponder and an RFID reader; and/or near field communication (NFC) technologies. For more information regarding NFC, refer to the following specifications all of which are incorporated by reference herein: ISO/IEC 18092/ECMA-340, Near Field Communication Interface and Protocol-1 (NFCIP-1); ISO/IEC 21481/ECMA-352, Near Field Communication Interface and Protocol-2 (NFCIP-2); and EMV 4.3 available at http://www.emvco.com/default.aspx.

The account number may be distributed and stored in any form of plastic, electronic, magnetic, radio frequency, wireless, audio and/or optical device capable of transmitting or downloading data from itself to a second device. A consumer account number may be, for example, a sixteen-digit account number, although each credit provider has its own numbering system, such as the fifteen-digit numbering system used by American Express. Each company's account numbers comply with that company's standardized format such that the company using a fifteen-digit format will generally use three-spaced sets of numbers, as represented by the number "0000 000000 00000". The first five to seven digits are reserved for processing purposes and identify the issuing bank, account type, etc. In this example, the last (fifteenth) digit is used as a sum check for the fifteen digit number. The intermediary eight-to-eleven digits are used to uniquely identify the consumer. A merchant account number may be, for example, any number or alpha-numeric characters that identify a particular merchant for purposes of account acceptance, account reconciliation, reporting, or the like.

In various embodiments, an account number may identify a consumer. In addition, in various embodiments, a consumer may be identified by a variety of identifiers, including, for example, an email address, a telephone number, a cookie id, a radio frequency identifier (RFID), a biometric, a motion, a measurement and/or the like.

Phrases and terms similar to "transaction account" may include any account that may be used to facilitate a financial transaction.

Phrases and terms similar to "financial institution" or "transaction account issuer" may include any entity that offers transaction account services. Although often referred to as a "financial institution," the financial institution may represent any type of bank, lender or other type of account issuing institution, such as credit account companies, account sponsoring companies, or third party issuers under contract with financial institutions. It is further noted that other participants may be involved in some phases of the transaction, such as an intermediary settlement institution.

Phrases and terms similar to "internal data" may include any data a credit issuer possesses or acquires pertaining to a particular consumer. Internal data may be gathered before, during, or after a relationship between die credit issuer and the transaction account holder (e.g., the consumer or buyer). Such data may include consumer demographic data. Consumer demographic data includes any data pertaining to a consumer. Consumer demographic data may include consumer name, address, telephone number, email address, employer and social security number. Consumer transactional data is any data pertaining to the particular transactions in which a consumer engages during any given time period. Consumer transactional data may include, for example, transaction amount, transaction date, transaction vendor/merchant, and transaction vendor/merchant location.

Transaction vendor/merchant location may contain a high degree of specificity to a vendor/merchant. For example, transaction vendor/merchant location may include a particular gasoline filing station in a particular postal code located at a particular cross section or address. Also, for example, transaction vendor/merchant location may include a particular web address, such as a Uniform Resource Locator ("URL"), an email address and/or an Internet Protocol ("IP") address for a vendor/merchant. Transaction vendor/merchant and transaction vendor/merchant location may be associated with a particular consumer and further associated with sets of consumers. Consumer payment data includes any data pertaining to a consumer's history of paying debt obligations. Consumer payment data may include consumer payment dates, payment amounts, balance amount, and credit limit Internal data may further comprise records of consumer service calls, complaints, requests for credit line increases, questions, and comments. A record of a consumer service call includes, for example, date of call, reason for call, and any transcript or summary of the actual call.

Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims.

Furthermore, no element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

Therefore, the following is claimed:

1. A method comprising:
   identifying, by a client device, a purchase transaction request from a merchant application executed on the client device;
   generating, by the client device, an in-app payment cryptogram for the purchase transaction request based at least in part on a limited use payment credential (LUPC);
   providing, by the client device, the in-app payment cryptogram to the merchant application, wherein the merchant application transmits the in-app payment cryptogram to a merchant computing device;
   receiving, by the client device, a request from a payment network associated with the merchant computing device to update the LUPC;
   determining, by the client device, that the client device is secure by executing a security library stored in the client device in response to receiving the request to update the LUPC, wherein the execution of the security library generates a device attestation response, and the device attestation response is transmitted to the payment network; and receiving, by the client device, an updated LUPC from the payment network.

2. The method of claim 1, further comprising:
identifying, by the client device, a selection of a payment instrument from a digital wallet; and
transmitting, by the client device, the selection of the payment instrument to a wallet service provider for the purchase transaction request.

3. The method of claim 2, further comprising:
transmitting, by the client device, to the wallet service provider a user credential for authentication of the payment instrument; and
receiving, by the client device, transaction security data from the wallet service provider in response to authentication of the payment instrument.

4. The method of claim 3, wherein the transaction security data comprises an unpredictable number generated by the wallet service provider, wherein the LUPC is generated based at least in part on the unpredictable number.

5. The method of claim 2, wherein providing the in-app payment cryptogram to the merchant application further comprises providing a token associated with the payment instrument to the merchant application.

6. The method of claim 1, wherein the merchant application comprises at least one of a browser application, a native application, a web application, or a web site executed on the client device.

7. The method of claim 1, wherein the LUPC is a session key configured to authorize a purchase using a digital wallet on the client device.

8. A system, comprising:
a computing device that includes a processor; and
a memory storing instructions, that when executed by the processor, cause the computing device to perform at least operations of:
identifying a purchase transaction request from a merchant application executed on the computing device;
generating an in-app payment cryptogram for the purchase transaction request based at least in part on a limited use payment credential (LUPC);
providing the in-app payment cryptogram to the merchant application, wherein the merchant application transmits the in-app payment cryptogram to a merchant computing device;
receiving a request from a payment network associated with the merchant computing device to update the LUPC;
determining that the computing device is secure by executing a security library stored in the computing device in response to receiving the request to update the LUPC, wherein the execution of the security library generates a device attestation response, and the device attestation response is transmitted to the payment network; and
receiving an updated LUPC from the payment network.

9. The system of claim 8, wherein the instructions, when executed by the processor, further cause the computing device to perform at least the operations of:
identifying a selection of a payment instrument from a digital wallet; and
transmitting the selection of the payment instrument to a wallet service provider for the purchase transaction request.

10. The system of claim 9, wherein the instructions, when executed by the processor, further cause the computing device to perform at least the operations of:
transmitting to the wallet service provider a user credential for authentication of the payment instrument; and
receiving transaction security data from the wallet service provider in response to authentication of the payment instrument.

11. The system of claim 10, wherein the transaction security data comprises an unpredictable number generated by the wallet service provider, wherein the LUPC is generated based at least in part on the unpredictable number.

12. The system of claim 8, wherein the instructions, when executed by the processor, cause the computing device to perform the providing of the in-app payment cryptogram to the merchant application which further cause the computing device to perform at least the operation of providing a token associated with a payment instrument to the merchant application.

13. The system of claim 8, wherein the merchant application comprises at least one of a browser application, a native application, a web application, or a web site executed on the computing device.

14. The system of claim 8, wherein the LUPC is a session key configured to authorize a purchase using a digital wallet on the computing device.

15. A non-transitory computer-readable medium embodying machine-executable instructions stored thereon that, when executed by a processor of a computing device, cause the computing device to perform at least operations of:
identifying a purchase transaction request from a merchant application executed on the computing device;
generating an in-app payment cryptogram for the purchase transaction request based at least in part on a limited use payment credential (LUPC);
providing the in-app payment cryptogram to the merchant application, wherein the merchant application transmits the in-app payment cryptogram to a merchant computing device;
receiving a request from a payment network associated with the merchant computing device to update the LUPC;
determining that the computing device is secure by executing a security library stored in the computing device in response to receiving the request to update the LUPC, wherein the execution of the security library generates a device attestation response, and the device attestation response is transmitted to the payment network; and
receiving an updated LUPC from the payment network.

16. The non-transitory computer-readable medium of claim 15, wherein the machine-executable instructions, when executed by the processor, cause the computing device to perform at least the operations of:
identifying a selection of a payment instrument from a digital wallet; and
transmitting the selection of the payment instrument to a wallet service provider for the purchase transaction request.

17. The non-transitory computer-readable medium of claim 16, wherein the machine-executable instructions, when executed by the processor, cause the computing device to perform at least the operations of:
transmitting to the wallet service provider a user credential for authentication of the payment instrument; and receiving transaction security data from the wallet service provider in response to authentication of the payment instrument.

18. The non-transitory computer-readable medium of claim 17, wherein the transaction security data comprises an unpredictable number generated by the wallet service provider, wherein the LUPC is generated based at least in part on the unpredictable number.

19. The non-transitory computer-readable medium of claim 16, wherein the machine-executable instructions, when executed by the processor, cause the computing device to perform the providing of the in-app payment cryptogram to the merchant application which further cause the computing device to perform at least the operation of providing a token associated with the payment instrument to the merchant application.

20. The non-transitory computer-readable medium of claim 15, wherein the LUPC is a session key configured to authorize a purchase using a digital wallet on the computing device.

* * * * *